(12) United States Patent
Wang

(10) Patent No.: US 11,032,277 B2
(45) Date of Patent: Jun. 8, 2021

(54) NETWORK ACCESS CONTROL

(71) Applicant: Lenovo (Beijing) Co., Ltd., Beijing (CN)

(72) Inventor: Hongyue Wang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 208 days.

(21) Appl. No.: 15/614,744

(22) Filed: Jun. 6, 2017

(65) Prior Publication Data

US 2017/0353452 A1 Dec. 7, 2017

(30) Foreign Application Priority Data

Jun. 6, 2016 (CN) .......................... 201610390901.5

(51) Int. Cl.
*H04L 29/06* (2006.01)
*H04M 15/00* (2006.01)
(Continued)

(52) U.S. Cl.
CPC ........ *H04L 63/0876* (2013.01); *H04M 15/00* (2013.01); *H04M 15/41* (2013.01); *H04M 15/43* (2013.01); *H04M 15/83* (2013.01); *H04M 15/852* (2013.01); *H04M 15/853* (2013.01); *H04M 15/854* (2013.01); *H04M 15/88* (2013.01); *H04M 15/882* (2013.01);
(Continued)

(58) Field of Classification Search
CPC ..... H04L 63/0876; H04L 63/10; H04L 63/08; H04M 15/00; H04M 15/41; H04M 15/43; H04M 15/83; H04M 17/00; H04M 15/852; H04M 15/853; H04M 15/854; H04M 15/88; H04M 15/882; H04M 15/885; H04W 4/24; H04W 8/22; H04W 12/06; H04W 48/14; H04W 48/17; H04W 48/18; H04W 88/06

See application file for complete search history.

(56) References Cited

U.S. PATENT DOCUMENTS

| 2012/0076121 A1 | 3/2012 | Choi et al. |
| 2015/0050937 A1* | 2/2015 | Rosar .................... H04W 8/082 455/445 |

(Continued)

FOREIGN PATENT DOCUMENTS

CN 101272308 A 9/2008

OTHER PUBLICATIONS

Yongmei Hao, "Realization of up-volume deceleration service in 4G network", Gansu Science and Technology, vol. 30 No. 18, Sep. 30, 2014 (Sep. 30, 2014) 4 Pages (including translation).

*Primary Examiner* — Joseph P Hirl
*Assistant Examiner* — Chi D Nguy
(74) *Attorney, Agent, or Firm* — Anova Law Group, PLLC

(57) ABSTRACT

A network access control method includes obtaining network information of an electronic device, determining, using the network information, whether the electronic device needs to use a first access point name (APN) network channel, and generating a network channel switching instruction in response to determining that the electronic device needs to use the first APN network channel. The network channel switching instruction instructs to switch the electronic device from a second APN network channel to the first APN network channel. The second APN network channel has access to more network resource addresses than the first APN network channel.

9 Claims, 5 Drawing Sheets

(51) Int. Cl.
*H04M 17/00* (2006.01)
*H04W 4/24* (2018.01)
*H04W 12/06* (2021.01)
*H04W 8/22* (2009.01)
*H04W 48/14* (2009.01)
*H04W 88/06* (2009.01)
*H04W 48/00* (2009.01)
*H04W 48/18* (2009.01)

(52) U.S. Cl.
CPC ......... *H04M 15/885* (2013.01); *H04M 17/00* (2013.01); *H04W 4/24* (2013.01); *H04W 8/22* (2013.01); *H04W 12/06* (2013.01); *H04W 48/14* (2013.01); *H04W 88/06* (2013.01); *H04W 48/17* (2013.01); *H04W 48/18* (2013.01)

(56) References Cited

U.S. PATENT DOCUMENTS

| | | | |
|---|---|---|---|
| 2015/0148020 A1* | 5/2015 | Laden | H04W 12/08 455/418 |
| 2016/0269566 A1* | 9/2016 | Gundamaraju | H04M 17/02 |
| 2017/0078922 A1* | 3/2017 | Raleigh | H04W 28/10 |
| 2019/0082057 A1* | 3/2019 | Westberg | H04W 8/08 |

* cited by examiner

NETWORK ACCESS CONTROL

CROSS-REFERENCE TO RELATED APPLICATION

This application claims priority to Chinese Patent Application No. 201610390901.5, filed on Jun. 6, 2016, the entire contents of which are incorporated herein by reference.

TECHNICAL FIELD

The present disclosure relates to a communications technology and, more particularly, to a network access control method, a server, and an electronic device.

BACKGROUND TECHNOLOGIES

A user needs to pay a fee for using a communication service, such as a network access service. Usually, the user needs to prepay a certain fee before using a corresponding communication service. In this situation, when the user's account associated with the communication service is overdue, the user will not be able to use the communication service.

In existing technologies, when the user's account is overdue, the user needs to use a different network, i.e., a network different from the network providing the communication service, to recharge online or go to a local store to recharge. While the user's account is overdue, the user cannot use the communication service, resulting loss to the user, such as the discontinuity of the service provided to the user. Further, using the different network to recharge online relies on the existence of an external network environment. When no external network exists, the recharging cannot be accomplished. On the other hand, going to the local store requires the user spend extra time, increasing the user's time cost.

SUMMARY

In accordance with the disclosure, there is provided a network access control method including obtaining network information of an electronic device, determining, using the network information, whether the electronic device needs to use a first access point name (APN) network channel, and generating a network channel switching instruction in response to determining that the electronic device needs to use the first APN network channel. The network channel switching instruction instructs to switch the electronic device from a second APN network channel to the first APN network channel. The second APN network channel has access to more network resource addresses than the first APN network channel.

Also in accordance with the disclosure, there is provided a server including a communication interface and a controller coupled to the communication interface. The communication interface obtains network information of an electronic device. The controller determines, using the network information, whether the electronic device needs to use a first APN network channel, and generates a network channel switching instruction in response to determining that the electronic device needs to use the first APN network channel. The network channel switching instruction instructs to switch the electronic device from a second APN network channel to the first APN network channel. The second APN network channel has access to more network resource addresses than the first APN network channel.

Also in accordance with the disclosure, there is provided an access control method including generating an activation request in response to activating an electronic device and sending the activation request to a server. The activation request requests to switch the electronic device from a first APN network channel to a second APN network channel. The second APN network channel has access to more network resource addresses than the first APN network channel.

DESCRIPTION OF EMBODIMENTS

Hereinafter, embodiments consistent with the disclosure will be described with reference to the drawings, which are merely examples for illustrative purposes and are not intended to limit the scope of the disclosure. Wherever possible, the same reference numbers will be used throughout the drawings to refer to the same or like parts.

Embodiments consistent with the disclosure include network access control methods, a server, and an electronic device. In some embodiments, a network access control method can be implemented in the server. In these embodiments, the server can serve as a control platform for controlling the switching of access point name (APN) network channels of the electronic device, and thus can also be referred to as a "control server." For example, the server can obtain network information of the electronic device. The server can determine whether the electronic device needs to use a first APN network channel for communication transmission based on a switching control strategy, to obtain a determination result. When the determination result indicates that the electronic device needs to use the first APN network channel for communication transmission, the server can generate and send a network channel switching instruction. The first network channel switching instruction instructs the electronic device to switch from a second APN network channel to the first APN network channel, such that the electronic device can communicate through the first APN network channel.

In some other embodiments, a network access control method can be implemented in the electronic device. For example, when the electronic device needs to be activated, the electronic device can generate an activation request and send the activation request to the server through the first APN network channel. The activation request can be used to request a permission to switch the electronic device from the first APN network channel to the second APN network channel.

Consistent with embodiments of the present disclosure, more network resource addresses can be accessed through the second APN network channel than through the first APN network channel. In this disclosure, the first APN can also be referred to as a specialized APN network channel and the second APN can also be referred to as a general APN network channel.

Figure 1:
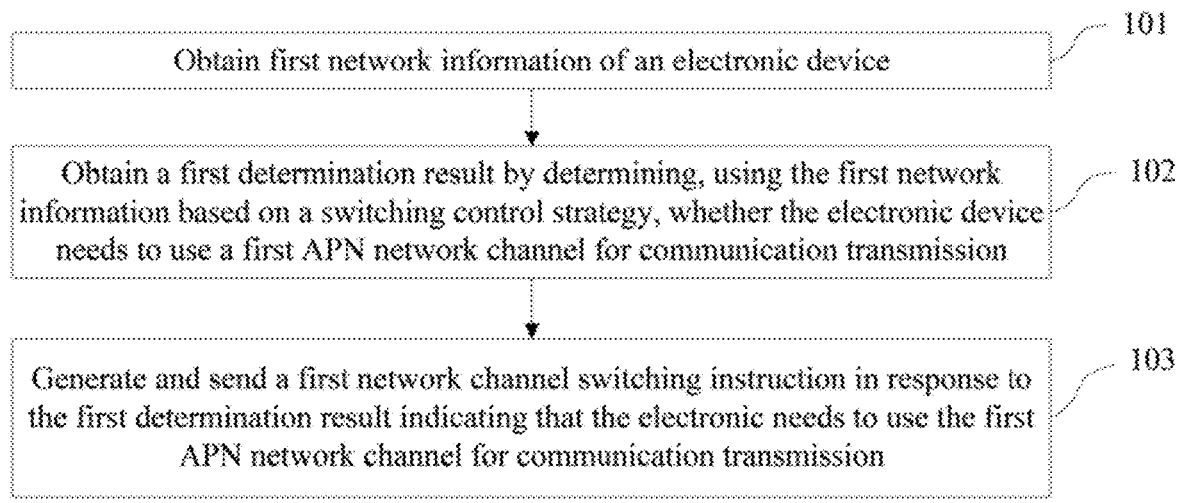
FIG. 1 is a flow chart of an example of a network access control method consistent with embodiments of the disclosure.

FIG. 1 is a flow chart of an example of a network access control method consistent with embodiments of the disclosure. The method shown in FIG. 1 can be implemented in the server.

As shown in FIG. 1, at 101, first network information of the electronic device is obtained. At 102, whether the electronic device needs to use the first APN network channel for communication transmission is determined using the first network information based on a switching control strategy, to obtain a first determination result.

In some embodiments, different switching control strategies can be adopted for different types of first network information of the electronic device. For example, charging information, e.g., information about how much service fee that the electronic device has incurred, can be used to determine whether to use the first APN network channel for communication transmission. In this scenario, the network information can include the charging information. The charging information can be provided by corresponding equipment of a service provider, such as charging equipment. When receiving the charging information, the server can obtain the first determination result by using the charging information to determine whether the electronic device can use the second APN network channel for communication transmission. If the first determination result indicates that the electronic device cannot use the second APN network channel for communication transmission, this means that the electronic device is overdue and needs recharging to continue the service, e.g., an account associated with the electronic device is overdue and needs recharging to continue the service provided by the service provider. In this situation, the server can execute process 103 to generate and send a first network channel switching instruction, as described in more detail below.

As another example, a network resource address can be used to determine whether to use the first APN network channel for communication transmission. In this scenario, the first network information can include a first network resource address. The first network resource address can be provided by corresponding equipment of the service provider. The server can obtain the first determination result by determining whether the first network resource address is on a white list. For example, in order to advertise their goods or services, some merchants may provide customers with free access to some resources. In this example, if the first determination result indicates that the first network resource address is on the white list, the server can execute process 103 to generate and send the first network channel switching instruction, as described in more detail below.

At 103, in response to the first determination result indicating that the electronic device needs to use the first APN network channel for communication transmission, the first network channel switching instruction is generated and sent. The first network channel switching instruction can be used to instruct to switch the electronic device from the second APN network channel to the first APN network channel, such that the electronic device can communicate through the first APN network channel. As described above, more network resource addresses can be visited through the second APN network channel than through the first APN network channel.

In some embodiments, the first network information includes the charging information, and the communication transmission through the first APN network channel can allow an update of the charging information of the electronic device. The updated charging information can indicate that the electronic device can use the second APN network channel for communication transmission.

In some embodiments, the first network information includes the first network resource address, and the communication transmission through the first APN network channel can allow the electronic device to visit the first network resource without incurring any data usage. That is, when the electronic device visit the first network resource through the first APN network channel, the equipment of the service provide does not count the data usage of the electronic device.

In some embodiments, the first network channel switching instruction can be sent to a server of the service provider, also referred to as a "service provider server," to trigger the server of the service provider to switch the APN interface. As such, the electronic device can be switched from the second APN network channel to the first APN network channel.

With methods consistent with some embodiments of the disclosure, the server can obtain the first network information of the electronic device, and obtain the first determination result by determining, using the first network information based on the switching control strategy, whether the electronic device needs to use the first APN network channel for communication transmission. If the first determination result indicates that the electronic device needs to use the first APN network channel for communication transmission, the server can generate and send the first network channel switching instruction. The first network channel switching instruction can be used for instructing to switch the electronic device from the second APN network channel to the first APN network channel, such that the electronic device can communicate through the first APN network channel. Consistent with the disclosure, more network resource addresses can be visited through the second APN network channel than through the first APN network channel. As such, according to the electronic device's need, the electronic device can be switched from the second APN network channel to the first APN network channel. To the user, only the APN network channel is changed but the network being used is not changed. Therefore, continuity of the communication service can be ensured.

Further, in some embodiments, the first determination result can be obtained by using the obtained charging information to determine whether the electronic device can use the second APN network channel for communication transmission. If the first determination result indicates that the electronic device cannot use the second APN network channel for communication transmission, the first network channel switching instruction can be generated and sent. The communication transmission through the first APN network channel can update the charging information of the electronic device. Thus, the user does not need to change the network being used and still can recharge conveniently to continue the service. That is, the user does not need to rely on an external network environment or spend time to go to the local store to recharge. As such, the user experience is improved.

In some other embodiments, the first determination result can be obtained by determining whether the obtained first network resource address is on the white list. If the first determination result indicates that the first network resource address is on the white list, the first network channel switching instruction can be generated and sent. The communication transmission through the first APN network channel can allow the electronic device to visit the first network resource without incurring any data usage. Thus, the user does not need to change the network being used and still can obtain relevant network resource without data usage. This is convenient to the user and also benefits the merchants. As such, the user experience is improved.

Figure 2:
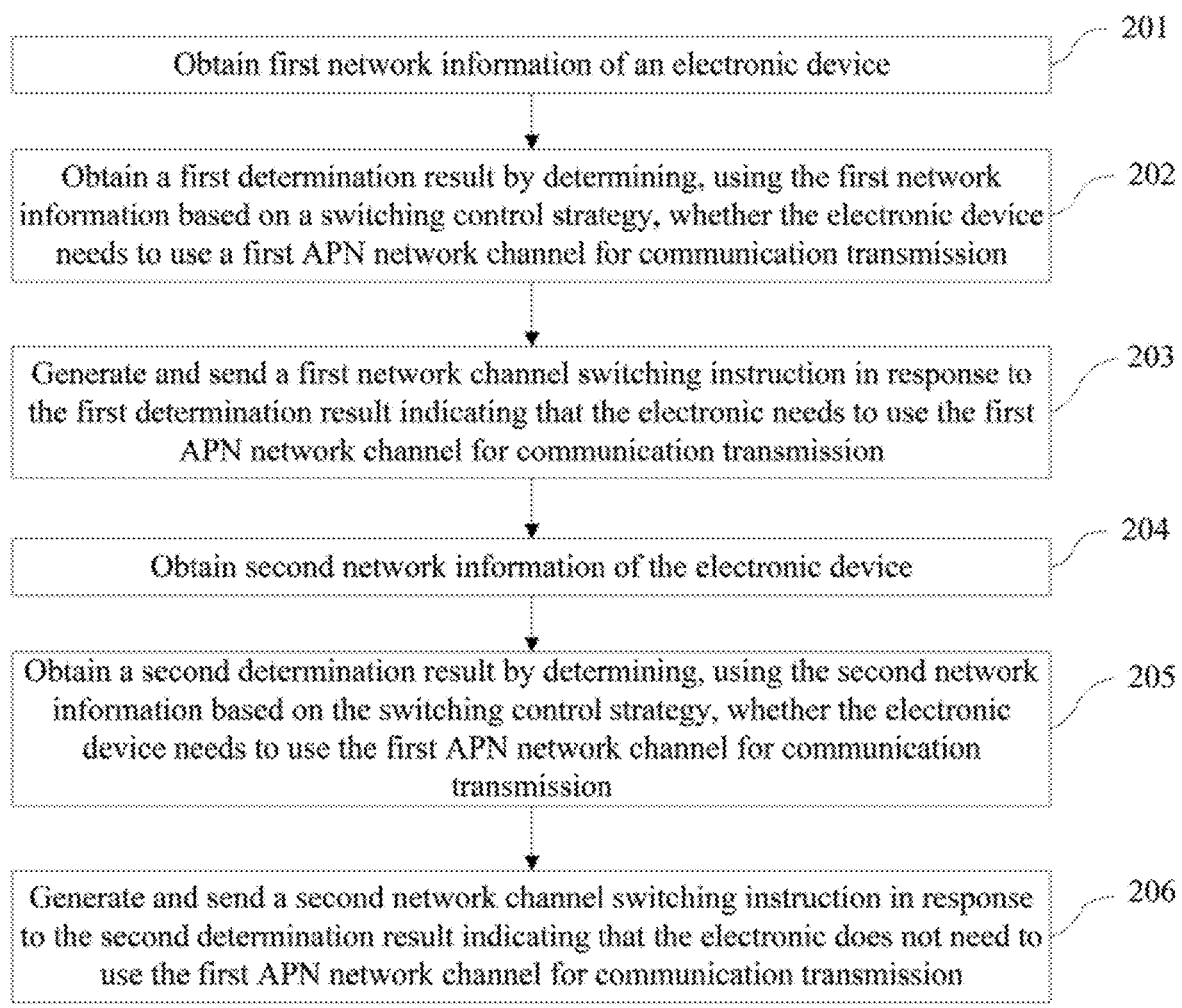
FIG. 2 is a flow chart of another example of a control method consistent with embodiments of the disclosure.

FIG. 2 is a flow chart of another example of a network access control method consistent with embodiments of the disclosure. The method shown in FIG. 2 can be implemented in the server.

As shown in FIG. 2, at 201, first network information of the electronic device is obtained. At 202, whether the electronic device needs to use the first APN network channel for communication transmission is determined using the first network information based on a switching, control strategy, to obtain a first determination result.

In some embodiments, different switching control strategies can be adopted for different types of first network information of the electronic device. For example, charging information, e.g., information about how much service fee that the electronic device has incurred, can be used to determine whether to use the first APN network channel for communication transmission. In this scenario, the network information can include the charging information. The charging information can be provided by corresponding equipment of a service provider, such as charging equipment. When receiving the charging information, the server can obtain the first determination result by using the charging information to determine whether the electronic device can use the second APN network channel for communication transmission. If the first determination result indicates that the electronic device cannot use the second APN network channel for communication transmission, this means that the electronic device is overdue and needs recharging to continue the service, e.g., an account associated with the electronic device is overdue and needs recharging to continue the service provided by the service provider. In this situation, the server can execute process 203 to generate and send a first network channel switching instruction, as described in more detail below.

As another example, a network resource address can be used to determine whether to use the first APN network channel for communication transmission. In this scenario, the first network information can include a first network resource address. The first network resource address can be provided by corresponding equipment of the service provider. The server can obtain the first determination result by determining whether the first network resource address is on a white list. For example, in order to advertise their goods or services, some merchants may provide customers with free access to some resources. In this example, if the first determination result indicates that the first network resource address is on the white list, the server can execute process 203 to generate and send the first network channel switching instruction, as described in more detail below.

At 203, in response to the first determination result indicating that the electronic device needs to use the first APN network channel for communication transmission, the first network channel switching instruction is generated and sent. The first network channel switching instruction can be used to instruct to switch the electronic device from the second APN network channel to the first APN network channel, such that the electronic device can communicate through the first APN network channel. As described above, more network resource addresses can be visited through the second APN network channel than through the first APN network channel.

In some embodiments, the first network information includes the charging information, and the communication transmission through the first APN network channel can allow an update of the charging information of the electronic device. The updated charging information can indicate that the electronic device can use the second APN network channel for communication transmission.

In some embodiments, the first network information includes the first network resource address, and the communication transmission through the first APN network channel can allow the electronic device to visit the first network resource without incurring any data usage. That is, when the electronic device visit the first network resource through the first APN network channel, the equipment of the service provide does not count the data usage of the electronic device.

In some embodiments, the first network channel switching, instruction can be sent to a server of the service provider, to trigger the server of the service provider to switch the APN interface. As such, the electronic device can be switched from the second APN network channel to the first APN network channel.

At 204, second network information of the electronic device is obtained. At 205, whether the electronic device needs to use the first APN network channel for communication transmission is determined using the second network information based on the switching control strategy, to obtain a second determination result.

Similar to the situation where the first network information is used to make the determination (e.g., process 202 described above), in the situation where the second network information is used to make the determination, different switching control strategies can be adopted for different types of second network information of the electronic device. For example, updated charging information can be used to determine whether to use the first APN network channel for communication transmission. In this scenario, the network information can be charging information. The charging information can be provided by the corresponding equipment of the service provider, such as the charging equipment. When receiving the updated charging information, the server can obtain the second determination result by using the updated charging information to determine whether the electronic device can use the second APN network channel for communication transmission. If the second determination result indicates that the electronic device can use the second APN network channel for communication transmission, this means that the electronic device has been recharged, e.g., the account associated with the electronic device has been recharged. In this situation, the server can execute process 206 to generate and send a second network channel switching instruction such that the electronic device can communicate through the second APN network channel, as described in more detail below.

As another example, a network resource address can be used to determine whether to use the first APN network channel for communication transmission. In this scenario, the obtained network information can include a second network resource address. The second network resource address can be provided by the corresponding equipment of the service provider. The server can obtain the second determination result by determining whether the second network resource address is on the white list. If the second determination result indicates that the second network resource address is not on the white list, this means that the network resource associated with the second network resource address does not include certain specific network resource, such as a free access network resource provided by a merchant. That is, data usage is needed for the electronic device to visit the network resource associated with the second network resource address. In this situation, the server can execute process 206 to generate and send the second network channel switching instruction, as described in more detail below.

At 206, in response to the second determination result indicating that the electronic device does not need to use the first APN network channel for communication transmission, a second network channel switching instruction is generated and sent. The second network channel switching instruction can be used to instruct to switch the electronic device to the second APN network channel, such that the electronic device can communicate through the second APN network channel.

In some embodiments, the second network channel switching instruction can be sent to the server of the service provider, to trigger the server of the service provider to switch the APN interface. As such, the electronic device can be switched from the first APN network channel to the second APN network channel.

With methods consistent with some embodiments of the disclosure, the server can obtain the first network information of the electronic device, and obtain the first determination result by determining, using the first network information based on the switching control strategy, whether the electronic device needs to use the first APN channel for communication transmission. If the first determination result indicates that the electronic device needs to use the first APN network channel tier communication transmission, the server can generate and send the first network channel switching instruction. The first network channel switching instruction can be used for instructing to switch the electronic device from the second APN network channel to the first APN network channel, such that the electronic device can communicate through the first APN network channel. Consistent with the disclosure, more network resource addresses can be visited through the second APN network channel than through the first APN network channel. As such, according to the electronic device's need, the electronic device can be switched from the second APN network channel to the first APN network channel. To the user, only the APN network channel is changed but the network being used is not changed. Therefore, continuity of the communication service can be ensured.

Further, the second network information of the electronic device can be obtained, and the second determination result can be obtained by determining, using the second network information based on the switching control strategy, whether the electronic device needs to use the first APN network channel for communication transmission. If the second determination result indicates that the electronic device does not need to use the first APN network channel for communication transmission, the second network channel switching instruction is generated and sent. The second network channel switching instruction can be used to instruct to switch the electronic device to the second APN network channel, such that the electronic device can communicate through the second APN network channel. As such, according to the electronic device's need, the electronic device can be switched between the first APN network channel and the second APN network channel. Therefore, the continuity of the communication service can be further ensured.

Further, in some embodiments, the first determination result can be obtained by using the obtained charging information to determine whether the electronic device can use the second APN network channel for communication transmission. If the first determination result indicates that the electronic device cannot use the second APN network channel for communication transmission, the first network channel switching instruction can be generated and sent. The communication transmission through the first APN network channel can update the charging information of the electronic device. Thus, the user does not need to change the network being used and still can recharge conveniently to continue the service. That is, the user does not need to rely on an external network environment or spend time to go to the local store to recharge. As such, the user experience is improved.

In some other embodiments, the first determination result can be obtained by determining whether the obtained first network resource address is on the white list. If the first determination result indicates that the first network resource address is on the white list, the first network channel switching instruction can be generated and sent. The communication transmission through the first APN network channel can allow the electronic device to visit the first network resource without incurring any data usage. Thus, the user does not need to change the network being used and still can obtain relevant network resource without data usage. This is convenient to the user and also benefits the merchants. As such, the user experience is improved.

Figure 3:
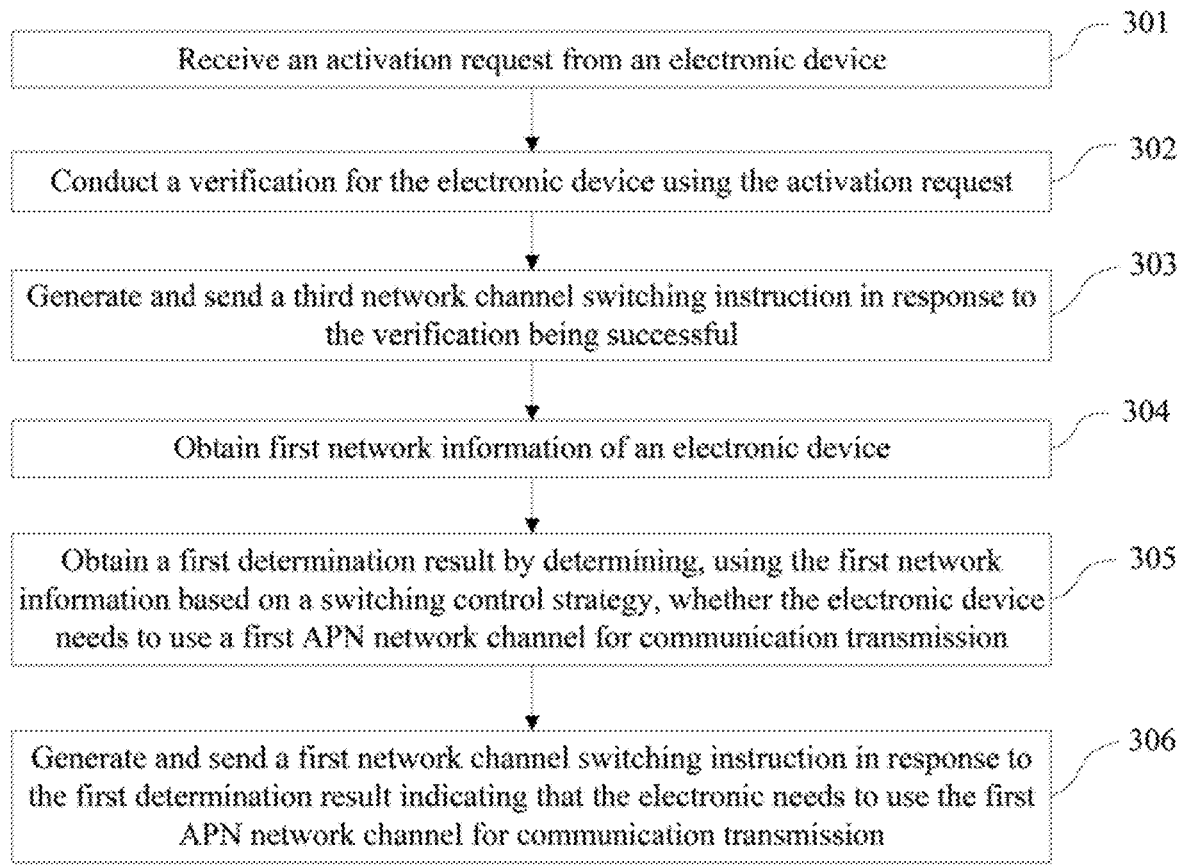
FIG. 3 is a flow chart of another example of a network access control method consistent with embodiments of the disclosure.

FIG. 3 is a flow chart of another example of a network access control method consistent with embodiments of the disclosure. The method shown in FIG. 3 can be implemented in the server.

As shown in FIG. 3, at 301, an activation request from the electronic device is received. At 302, a verification for the electronic device is conducted using the activation request. At 303, in response to the verification being successful, a third network channel switching instruction is generated and sent. The third network channel switching instruction can instruct to switch the electronic device from the first APN network channel to the second APN network channel.

In some embodiments, switching between the first APN network channel and the second APN network channel can be performed according to the need of the electronic device. To allow the server to better manage and control the electronic device, an application (APP) can be installed on the electronic device, which allows the electronic device to visit some network resource addresses through a specialized APN network channel (the first APN network channel). When a user of the electronic device wishes to visit more network resource addresses through a general APN network channel (the second APN network channel), the user can send the activation request to the server through the APP. Thus, the server can control the switching of the electronic device from the first APN network channel to the second APN network channel.

In some embodiments, the third network channel switching instruction can be sent to the server of the service provider to trigger the server of the service provider to switch the APN interface. As such, the electronic device can be switched from the first APN network channel to the second APN network channel.

At 304, first network information of the electronic device is obtained. At 305, whether the electronic device needs to use the first APN network channel for communication transmission is determined using the first network information based on a switching control strategy, to obtain a first determination result.

In some embodiments, different switching control strategies can be adopted for different types of first network information of the electronic device. For example, charging information, e.g., information about how much service fee that the electronic device has incurred, can be used to determine whether to use the first APN network channel for communication transmission. In this scenario, the network information can include the charging information. The charging information can be provided by corresponding equipment of a service provider, such as charging equipment. When receiving the charging information, the server can obtain the first determination result by using the charging information to determine whether the electronic device can use the second APN network channel for communication transmission. If the first determination result indicates that the electronic device cannot use the second APN network channel for communication transmission, this means that the electronic device is overdue and needs recharging to continue the service, e.g., an account associated with the electronic device is overdue and needs recharging to continue the service provided by the service provider. In this situation, the server can execute process 306 to generate and send a first network channel switching instruction, as described in more detail below.

As another example, a network resource address can be used to determine whether to use the first APN network channel for communication transmission. In this scenario, the first network information can include a first network resource address. The first network resource address can be provided by corresponding equipment of the service provider. The server can obtain the first determination result by determining whether the first network resource address is on a white list. For example, in order to advertise their goods or services, some merchants may provide customers with free access to some resources. In this example, if the first determination result indicates that the first network resource address is on the white list, the server can execute process 306 to generate and send the first network channel switching instruction, as described in more detail below.

At 306, in response to the first determination result indicating that the electronic device needs to use the first APN network channel for communication transmission, the first network channel switching instruction is generated and sent. The first network channel switching instruction can be used to instruct to switch the electronic device from the second APN network channel to the first APN network channel, such that the electronic device can communicate through the first APN network channel. As described above, more network resource addresses can be visited through the second APN network channel than through the first APN network channel.

In some embodiments, the first network information includes the charging information, and the communication transmission through the first APN network channel can allow an update of the charging information of the electronic device. The updated charging information can indicate that the electronic device can use the second APN network channel for communication transmission.

In some embodiments, the first network information includes the first network resource address, and the communication transmission through the first APN network channel can allow the electronic device to visit the first network resource without incurring any data usage. That is, when the electronic device visit the first network resource through the first APN network channel, the equipment of the service provide does not count the data usage of the electronic device.

In some embodiments, the first network channel switching instruction can be sent to a server of the service provider, to trigger the server of the service provider to switch the APN interface. As such, the electronic device can be switched from the second APN network channel to the first APN network channel.

With methods consistent with some embodiments of the disclosure, the server can obtain the first network information of the electronic device, and obtain the first determination result by determining, using the first network information based on the switching control strategy, whether the electronic device needs to use the first APN network channel for communication transmission. If the first determination result indicates that the electronic device needs to use the first APN network channel for communication transmission, the server can generate and send the first network channel switching instruction. The first network channel switching instruction can be used for instructing to switch the electronic device from the second APN network channel to the first APN network channel, such that the electronic device can communicate through the first APN network channel. Consistent with the disclosure, more network resource addresses can be visited through the second APN network channel than through the first APN network channel. As such, according to the electronic device's need, the electronic device can be switched from the second APN network channel to the first APN network channel. To the user, only the APN network channel is changed but the network being used is not changed. Therefore, continuity of the communication service can be ensured.

Further, in some embodiments, the first determination result can be obtained by using the obtained charging information to determine whether the electronic device can use the second APN network channel for communication transmission. If the first determination result indicates that the electronic device cannot use the second APN network channel for communication transmission, the first network channel switching instruction can be generated and sent. The communication transmission through the first APN network channel can update the charging information of the electronic device. Thus, the user does not need to change the network being used and still can recharge conveniently to continue the service. That is, the user does not need to rely on an external network environment or spend time to go to the local store to recharge. As such, the user experience is improved.

In some other embodiments, the first determination result can be obtained by determining whether the obtained first network resource address is on the white list. If the first determination result indicates that the first network resource address is on the white list, the first network channel switching instruction can be generated and sent. The communication transmission through the first APN network channel can allow the electronic device to visit the first network resource without incurring any data usage. Thus, the user does not need to change the network being used and still can obtain relevant network resource without data usage. This is convenient to the user and also benefits the merchants. As such, the user experience is improved.

Figure 4:
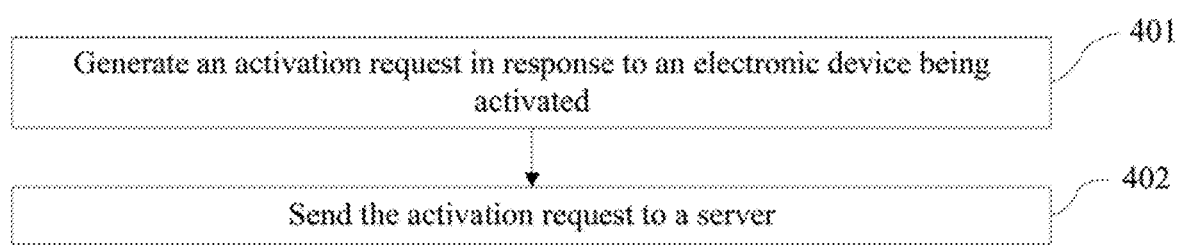
FIG. 4 is a flow chart of another example of a network access control method consistent with embodiments of the disclosure.

FIG. 4 is a flow chart of another example of s control method consistent with embodiments of the disclosure. The method shown in FIG. 4 can be implemented in the electronic device.

As shown in FIG. 4, at 401, in response to the electronic device being activated, activation request is generated. In some embodiments, switching, between the first APN network channel and the second APN network channel can be performed according to the need of the electronic device. To allow the server to better manage and control the electronic device, an application (APP) can be installed on the electronic device, which allows the electronic device to visit some network resource addresses through a specialized APN network channel (the first APN network channel). When a user of the electronic deice wishes to visit more network resource addresses through a general APN network channel (the second APN network channel), the user can send the activation request to the server through the APP. Thus, the server can control the switching of the electronic device from the first APN network channel to the second APN network channel.

At 402, the activation request is sent to the server. The activation request is used to request to switch the electronic device from the first APN network channel to the second APN network channel. As described above, more network resource addresses can be visited through the second APN network channel than through the first APN network channel.

Figure 5:
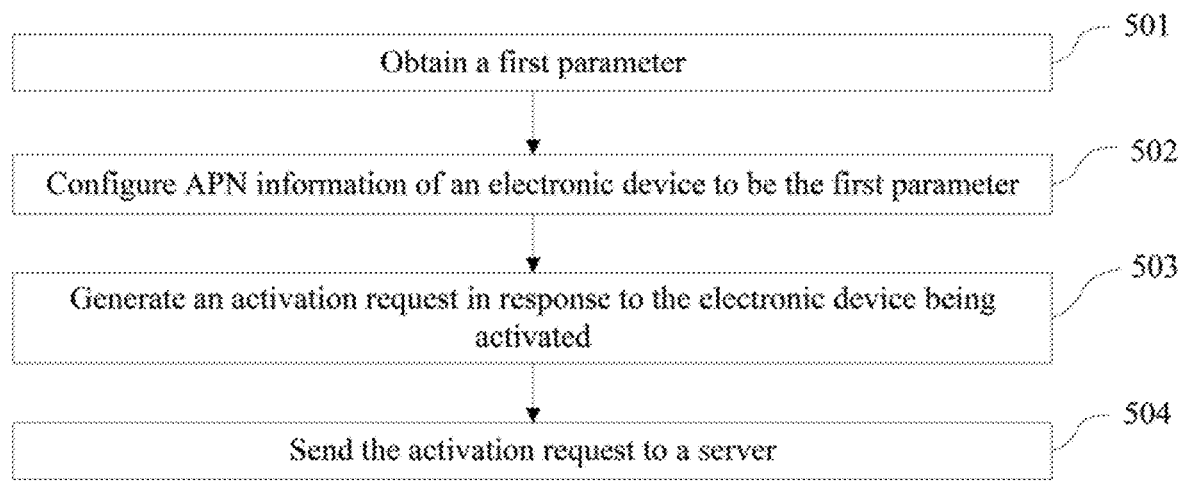
FIG. 5 is a flow chart of another example of a network access control method consistent with embodiments of the disclosure.

FIG. 5 is a flow chart of another ample of a network access control method consistent with embodiments of the disclosure. The method shown in FIG. 5 can be implemented in the electronic device.

As shown in FIG. 5, at 501, a first parameter is obtained. In some embodiments, first parameter can include APN information corresponding to the first APN network channel.

At 502 APN information of the electronic device is configured to be the first parameter. In some embodiments, switching between the first APN network channel and the second APN network channel can be performed according to the need of the electronic device. To allow the server to better manage and control the electronic device, an application (APP) can be installed on the electronic device, which allows the electronic device to visit some network resource addresses through a specialized APN network channel (the first APN network channel).

By configuring the APN information of the electronic device to be the APN information of the first APN network channel, the electronic device can visit corresponding network resource addresses through the first APN network channel.

At 503, response to the electronic device being activated, an activation request is generated. In some embodiments, the electronic device can visit some network resource addresses through the first APN network channel before being activated. Thus, when a user of the electronic device wishes to visit more network reset e addresses through a general APN network channel (the second APN network channel), the user can send the activation request to the servo through the APP. Thus, the server can control the switching of the electronic device from the first APN network channel to the second APN network channel.

At 504, the activation request is sent to the server. The activation request is used to request to switch the electronic device from the first APN network channel to the second APN network channel. As described above, more network resource addresses can be visited through the second APN network channel than through the first APN network channel.

Figure 6:
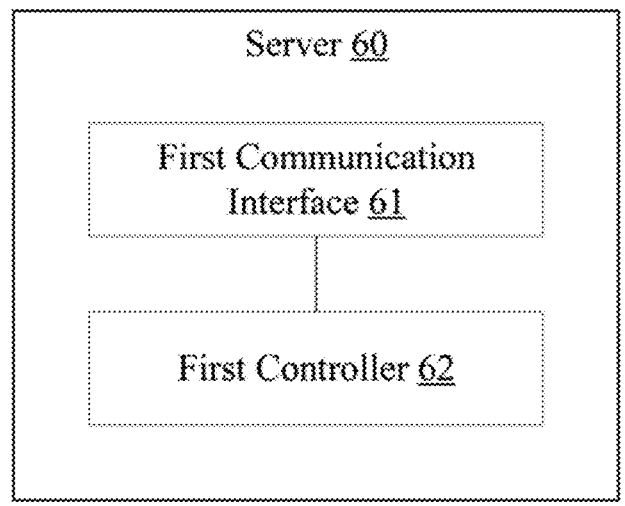
FIG. 6 is a structural diagram of an example of a server consistent with embodiments of the disclosure.

FIG. 6 is a structural diagram of n example of a server 60 consistent with embodiments of the disclosure. The server 60 can serve as a control platform for controlling the switching of the APN network channel of the electronic device.

As shown in FIG. 6, the server 60 includes a first communication interface 61 and a first controller 62. The first communication interface 61 can obtain first network information of the electronic device. The first controller 62 can determine, using the first network information based on a switching control strategy, whether the electronic device needs to use the first APN network channel for communication transmission, to obtain a first determination result. The first controller 62 further can generate a first network channel switching instruction in a response to the first determination result indicating the electronic device needs to use the first APN network channel for communication transmission.

The first communication interface 61 further can send the first network channel switching instruction. The first network channel switching instruction can be used to instruct to switch the electronic device from the second APN network channel to the first APN network channel, such that the electronic device can communicate through the first APN network channel. As described above, more network resource addresses can be visited through the second APN network channel than through the first APN network channel.

In some embodiments, depending on the different network information obtained by the first communication interface 61, the first controller 62 can adopt different switching control strategies when using the first network information to determine whether the first electronic device needs to use the first APN network channel for communication transmission. For example, the first controller 62 can use charging information to determine whether to use the first APN network channel for communication transmission. In this scenario, the network information obtained by the first communication interface 61 can include the charging information. The charging information can be provided by corresponding equipment of a service provider, such as charging equipment. When receiving the charging information, the first controller 62 can obtain the first determination result by using the charging formation to determine whether the electronic device can use the second APN network channel for communication transmission. If the first determination result indicates that the electronic device cannot use the second APN network channel for communication transmission, this means that the electronic device is overdue and needs recharging to continue the service, e.g., an account associated with the electronic device is overdue and needs recharging to continue the service provided by the service provider.

As another example, the first controller 62 can use a network resource address to determine whether to use the first APN network channel for communication transmission. In this scenario, the network information obtained by the first communication interface 61 can include a first network resource address. The first network resource address can be provided by corresponding equipment of the service provider. The first controller 62 can use the first network resource address to determine whether the electronic device can use the second APN network channel for communication transmission, to obtain the first determination result. If the first determination result indicates that the electronic device cannot use the second APN network channel for communication transmission, the first network channel switching instruction can be generated. This method is suitable to merchants who wish to provide customers with free access to some resources in order to advertise their goods or services.

In the embodiments that the first network information includes the charging information, the communication transmission through the first APN network channel can allow an update of the charging information of the electronic device. The updated charging information can indicate that the electronic device can use the second APN network channel for communication transmission.

In the embodiments that the first network information includes the first network resource address, and the communication transmission through the first APN network channel can allow the electronic device to visit the first network resource without incurring any data usage. That is, when the electronic device visit the first network resource through the first APN network channel, the equipment of the service provide does not count the data usage of the electronic device.

In some embodiments, the first network channel switching instruction can be sent to a server of the service provider, to trigger the server of the service provider to switch the APN interface. As such, the electronic device can be switched from the second APN network channel to the first APN network channel.

In some embodiments, after the electronic device is switched from the second APN network channel to the first APN network channel, the first communication interface 61 can further obtain second network information of the electronic device. The first controller 62 can further obtain a second determination result by determining, using the second network based on the switching control strategy, whether the electronic device needs to use the first APN network channel for communication transmission. If the second determination result indicates that the electronic device does not need to use the first APN network channel for communication transmission, the first controller 62 can generate a second network channel switching instruction. The first communication interface 61 can then send the second network channel switching instruction, to instruct the electronic device to communicate through the second APN network channel.

Similar to the processing of the first network information described above, the first controller 62 can adopt different switching control strategies when using different types of second network information to determine whether the electronic device needs to use the first APN network channel for communication transmission. For example, the first controller 62 can use updated charging information to determine whether to use the first APN network channel for communication transmission. In this scenario, the obtained network information can include charging information. The charging information can be provided by the corresponding equipment of the service provider, such as the charging equipment. When receiving the updated charging information, the first controller 62 can obtain the second determination result by using the updated charging information to determine whether the electronic device can use the second APN network channel for communication transmission. If the second determination result indicates that the electronic device can use the second APN network channel for communication transmission, this means that the electronic device has been recharged, e.g., the account associated with the electronic device has been recharged. In this situation, the second network channel switching instruction can be generated and sent such that the electronic device can communicate through the second APN network channel.

As another example, the first controller 62 can use a network resource address to determine whether to use the first APN network channel for communication transmission. In this scenario, the obtained network information can be a second network resource address. The second network resource address can be provided by the corresponding equipment of the service provider. The server can obtain the second determination result by determining whether the second network resource address is on the white list. If the second determination result indicates that the second network resource address is not on the white list, this means that the network resource associated with the second network resource address does not include certain specific network resource, such as a free-access network resource provided by a merchant. That is, data usage is needed for the electronic device to visit the network resource associated with the second network resource address. In this situation, the second network channel switching instruction can be generated.

In some embodiments, the second network channel switching instruction can be sent to the server of the service provider, to trigger the server of the service provider to switch the APN interface. As such, the electronic device can be switched from the first APN network channel to the second APN network channel.

In some embodiments, the first communication interface 61 can also receive pan activation request from the electronic device. The first controller 62 can conduct a verification for the electronic device using the activation request and, in response to the verification being successful, generate a third network channel switching instruction. The first communication interface 61 can send the third network channel switching instruction. The third network channels switching instruction can instruct to switch the electronic device from the first APN network channel to the second APN network channel.

In some embodiments, the server consistent with the disclosure, such as the server 60 described above, can further include, for example, a memory, an input/output interface, and a power source. The server can include more or less components than described above, or include one or more alternatives of one or more components described above.

In a server consistent with the disclosure, such as the server 60 described above, the first communication interface 61 can obtain the first network information of the electronic device, and the first controller can obtain the first determination result by determining, using the first network information based on the switching control strategy, whether the electronic device needs to use the first APN network channel for communication transmission. If the first determination result indicates that the electronic needs to use the first APN network channel for communication transmission, the controller can generate and send the first network channel switching instruction. The first network channel switching instruction can be used for instructing to switch the electronic device from the second APN network channel to the first APN network channel, such that the electronic device can communicate, through the first APN network channel. Consistent with the disclosure, more network resource addresses can be visited through the second APN network channel than through the first APN network channel. As such, according to the electronic device's need, the electronic device can be switched from the second APN network channel to the first APN network channel. To the user, only the APN network channel is changed but the network being used is not changed. Therefore, continuity of the communication service can be ensured.

Further, the first communication interface 61 can obtain the second network information of the electronic device, and the first controller 62 can obtain the second determination result by determining, using the second network information based on the switching control strategy, whether the electronic device needs to use the first APN network channel for communication transmission. If the second determination result indicates that the electronic device does not need to use the first APN network channel for communication transmission, the first controller 62 can generate the second network channel switching instruction and the first communication interface 61 can send the second network channel switching instruction. The second network channel switching instruction can be used to instruct to switch the electronic device to the second APN network channel, such that the electronic device can communicate through the second APN network channel. As such, according to the electronic device's need, the electronic device can be switched between the first APN network channel and the second APN network channel. Therefore, the continuity of the communication service can be further ensured.

Further, in some embodiments the first determination result can be obtained by using the obtained charging information to determine whether the electronic device can use the second APN network channel for communication transmission. If the first determination result indicates that the electronic device cannot use the second APN network channel for communication transmission, the first network channel switching instruction can be generated and sent. The communication transmission through the first APN network channel can update the charging information of the electronic device. Thus, the user does not need to change the network being used and still can recharge conveniently to continue the service. That is, the user does not need to rely on an external network environment or spend time to go to the local store to recharge. As such, the user experience is improved.

In some other embodiments, the first determination result can be obtained by determining whether the obtained first network resource address is on the white list. If the first determination result indicates that the first network resource address is on the white list, the first network channel switching instruction can be generated and sent. The communication transmission through the first APN network channel can allow the electronic device to visit the first network resource without incurring any data usage. Thus, the user does not need to change the network being used and still can obtain relevant network resource without data usage. This is convenient to the user and also benefits the merchants. As such, the user experience is improved.

Figure 7:
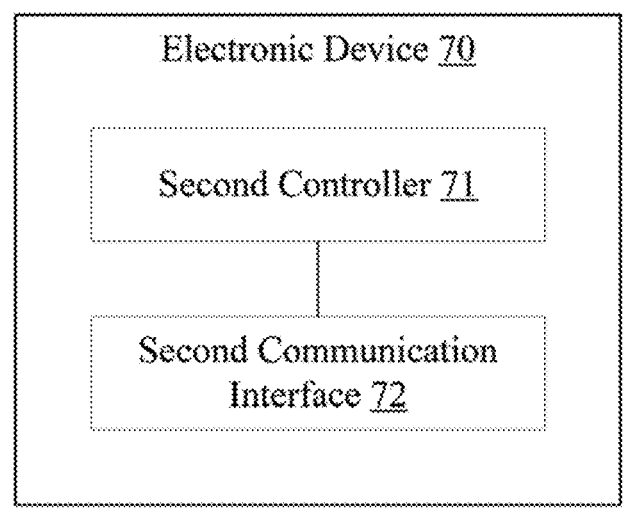
FIG. 7 is a structural diagram of an example of an electronic device consistent with embodiments of the disclosure.

FIG. 7 is a structural diagram of an example of an electronic device 70 consistent with embodiments of the disclosure. As shown in FIG. 7, the electronic device 70 includes a second controller 71 for generating an activation request in response to the electronic device 70 being activated and a second communication interlace 72 for sending the activation request to the server. The activation request is used to request to switch the electronic device from the first APN network channel to the second APN network channel. As described above, more network resource addresses can be visited through the second APN network channel than through the first APN network channel.

In some embodiments, switching between the first APN network channel and the second APN network channel can be performed according to the need of the electronic device. To allow the server to better manage and control the electronic device 70, an application (APP) can be installed on the electronic device 70 and executed by the second controller 71. The APP allows the electronic device 70 to visit some network resource addresses through a specialized APN network channel (the first APN network channel). When a user of the electronic device 70 wishes to visit more network resource addresses through a general APN network channel (the second APN network channel), the user can send the activation request to the server through the APP (executed by the second controller 71). Thus, the server can control the switching of the electronic device 70 from the first APN network channel to the second APN network channel.

In some embodiments, the second controller 71 can also obtain a first parameter before the electronic device 70 being activated. In some embodiments, the first parameter can include APN information corresponding to the first APN network channel. The second controller 71 can also configure APN information of the electronic device to be the first parameter.

In some embodiments, switching between the first APN network channel and the second APN network channel can be performed according to the need of the electronic device. To allow the server to better manage and control the electronic device 70, an application (APP) can be installed on the electronic device 70 and executed by the second controller 71. The APP allows the electronic device 70 to visit some network resource addresses through a specialized APN network channel (the first APN network channel).

By configuring the APN information of the electronic device 70 to be the APN information of the first APN network channel using the second controller 71, the electronic device 70 can visit corresponding network resource addresses through the first APN network channel.

In some embodiments, the electronic device consistent with the disclosure, such as the electronic device 70 described above, can further include, for example, an audio/video (A/V) input interface, a user input interface, a memory, an input/output interface, a power source, and an audio output interface. The electronic device can include more or less components than described above, or include one or more alternatives of one or more components described above.

Figure 8:
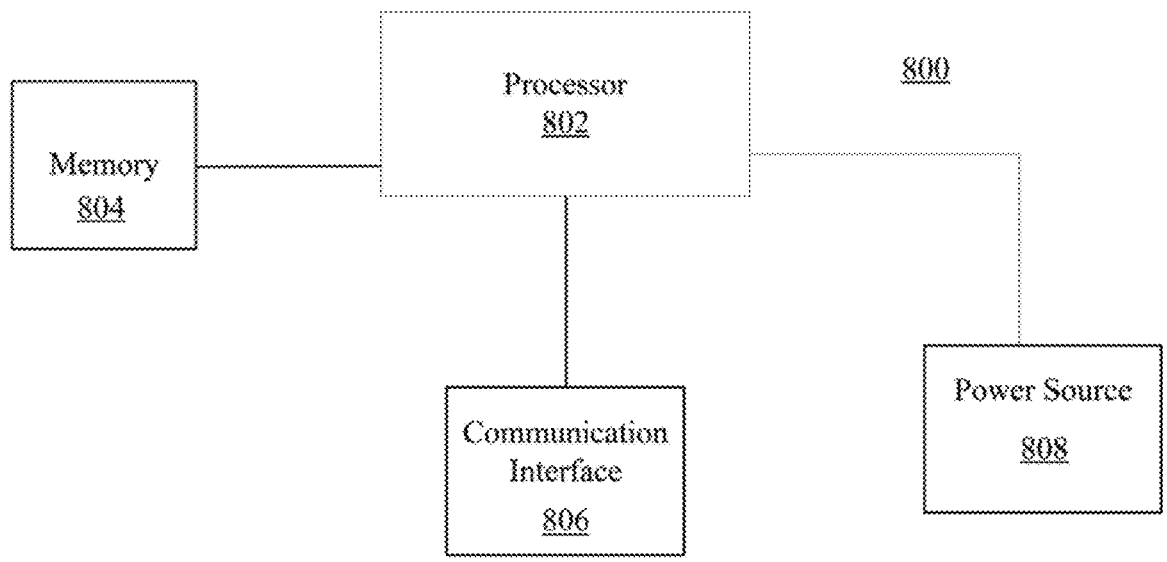
FIG. 8 is a structural diagram of another example of a server consistent with embodiments of the disclosure.

FIG. 8 is a structural diagram of another example of a server 800 consistent with embodiments of the disclosure. As shown in FIG. 8, the server 800 includes a processor 802, a memory 804, a communication interlace 806, and a power source 808. Other components may be added and certain components may be removed without departing from the principles of the embodiments.

The processor 802 may include, for example, a central processing unit (CPU), a graphic processing unit (GPU), a general purpose microprocessor, a digital signal processor (DSP), a microcontroller, or an application specific integrated circuit (ASIC). The processor 502 may execute sequences of computer program instructions to perform various processes associated with the server 800.

The memory 804 stores various types of data to support the operation of the server 800, including instructions, such as application programs, executable by the processor 802. The instructions, when executed by the processor 802, can cause the processor 802 to perform a method consistent with the disclosure, such as one of the examples of network access control method described above. The memory 802 can include a non-transitory computer-readable storage medium and can be implemented using any type of volatile or non-volatile memory device or combination thereof, such as a static random access memory (SRAM), a read-only memory (ROM), an erasable programmable ROM (EPROM), an electrically erasable programmable ROM (EEPROM), a magnetic memory, a flash memory, or a magnetic or optical disc.

The communication interface 806 may provide communication connections such that the server 800 can be accessed remotely and/or communicate with other systems through computer networks or other communication networks via various communication protocols, such as transmission control protocol/internet protocol (TCP/IP), hypertext transfer protocol (HTTP), etc.

The power source 808 can provide power to various components of the server 800. The power source 808 may include a power management system, one or more power inputs, and other components associated with the generation, management, and distribution of power in the server 800.

Figure 9:
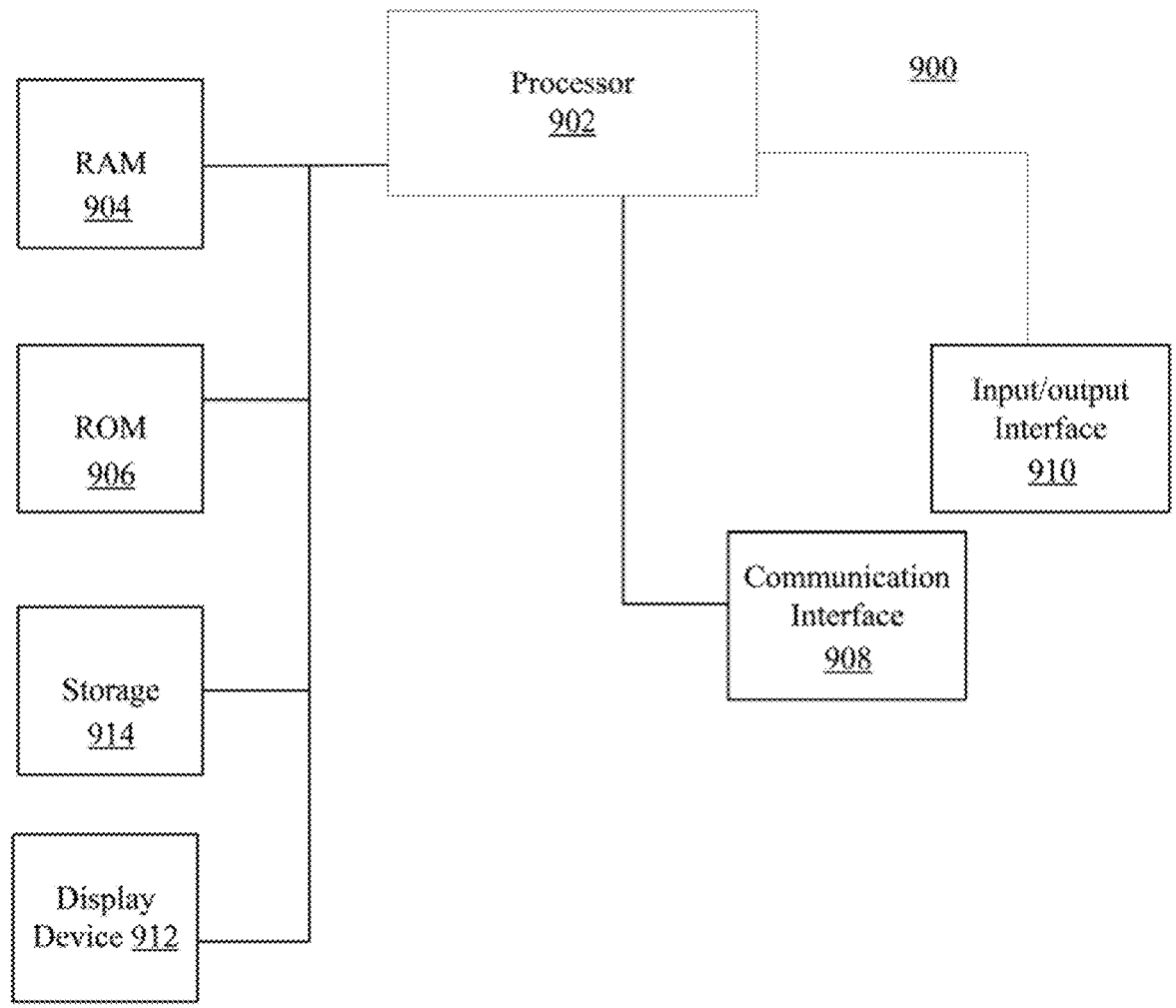
FIG. 9 is a structural diagram of another example of an electronic device consistent with embodiments of the disclosure.

FIG. 9 is a structural diagram of another example of an electronic device 900 consistent with embodiments of the disclosure. The electronic device 900 may include one of a variety of personal or wearable computing devices, such as a mobile phone, a glass-type computing device, a tablet computer, or a notebook computer, or any portable, pocket-sized, handheld, head-mounted, wearable, computer built-in, or vehicle mounted mobile device.

As shown in FIG. 9, the electronic device 900 includes a processor 902, a RAM 904, a ROM 906, a communication interface 908, an input/output interface 910, a display device 912, and a storage unit 914. Other components may be added and certain components may be removed without departing from the principles of the disclosed embodiments.

The processor 902 may include, for example, a CPU, a GPU, a general purpose microprocessor, a DSP, a microcontroller, or an ASIC. The processor 902 may execute sequences of computer program instructions to perform various processes associated with the electronic device 902, including a method consistent with the disclosure, such as one of the above-described examples of network access control method. The computer program instructions may be loaded into the RAM 904 for execution by the processor 902 from the ROM 906.

The communication interlace 908 may provide communication connections such that the electronic device 900 can be accessed remotely and/or communicate with other systems through computer networks or other communication networks via various communication protocols, such as transmission control protocol/internet protocol (TCP/IP) hypertext transfer protocol (HTTP), etc.

The input/output interface 910 may be provided for users to input information into the electronic device 900 or for the users to receive information from the electronic device 900. For example, the input/output interface 910 may include any appropriate input device, such as a remote control, a keyboard, a mouse, an electronic tablet, voice communication devices, or any other optical or wireless input devices. The input/output interface 910 may also include certain sensors, such as camera(s), eye-trackers, and other types of sensing components to input various user or environmental information to the electronic device 900 for analysis and processing.

The display device 912 may include any appropriate display screen, such as a liquid-crystal display, a light-emitting diode display, a touch panel, or a projector. The storage 914 may include any appropriate type of storage medium, such as a CD-ROM, a hard disk, a flash drive, an optical storage, a DVD drive, or other type of storage devices. During operation of the electronic device 900, the processor 902 may perform certain information processing processes.

In the disclosure, the term "an embodiment" may include relevant features, structures, or characteristics that are not explicitly mentioned or described. Reference to, e.g., "an embodiment," "the embodiment," or "some embodiments," does not necessarily mean the same embodiment or embodiments. The features, structures, or characteristics can be combined as appropriate in one or more embodiments. The reference numerals used in the disclosure do not indicate or imply any particular sequence or order for executing the disclosed processes. The order of the processes should be determined based on their functions and internal logics.

Further, terms "include" and "comprise," and any other alternative forms of such terms, used in the disclosure intend to be nonexclusive. That is, a process, method, article, or device described as including certain elements does not only include the elements that are explicitly listed, but may also include other elements that are not explicitly listed or elements that are inherent to the process, method, article, or device. Other than being explicitly specified, an element following the phrase "including a" does not exclude the existence of another same element in the process, method, article, or device that includes the element.

The disclosed devices and methods can be implemented in other manners. The above-described servers and devices are merely examples. For example, different units may be defined merely according to their logical functions and can be defined according to a different manner. For example, multiple units or components can be combined or integrated into another system, or some features can be omitted or not executed. Further, the coupling, direct coupling, or communication connection between various components can be implemented by interfaces. The indirect coupling or communication connection between various devices or units can be electrical, mechanical, or another form.

Units described as separate components may or may not be physically separated from each other. A component described or shown as a unit play or may not be a physical unit. The units can be located in a same place or distributed on multiple network units. Some or all of the units can be chosen to realize purpose of the disclosure according to actual need.

Further, various functional units can be all integrated in one processing unit or be separate, individual units. Two or more units can be integrated in one unit. A unit can be implemented by hardware or by a combination of hardware and software.

It is understood by persons of ordinary skill in the art that all or some of the processes consistent with the disclosure can be implemented by hardware as instructed by a program, which can be stored in a non-transitory computer-readable storage medium. The program, when executed, can cause, for example, a processor to perform a method consistent with the disclosure, such as one of the examples of the methods described above. The storage medium can include a medium that can store program codes, such as a mobile storage, a read only memory (ROM), a diskette, or a compact disc.

Further, software functional modules for implementing a method consistent with the disclosure can be stored in a non-transitory computer-readable storage medium. Thus, part or all of the technical solutions consistent with the disclosure can be implemented as computer software product stored in a storage medium. The software product may include instructions that can cause computer equipment, such as a personal computer, a server, or network equipment, to perform part or all of a method consistent with the disclosure. The storage medium can include a medium that can store program codes, such as a mobile storage, a ROM, a diskette, or a compact disc.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A network access control method comprising:
   obtaining network information of an electronic device, the network information including whether an account associated with the electronic device is overdue;
   determining whether a first network resource address to be accessed is on a white list;
   in response to the account associated with the electronic device being overdue and the first network resource address being on the white list, generating a first network channel switching instruction, wherein the first network channel switching instruction instructs to switch the electronic device from a second access point name (APN) network channel to a first APN network channel, accessing the network through the first APN network channel does not incur data usage counting, and accessing the network through the second APN network channel incurs data usage counting;
   after the electronic device has been switched from the second APN network channel to the first APN network channel, obtaining further network information of the electronic device, the further network information including whether the account associated with the electronic device has been recharged;
   determining whether a second network resource address to be accessed is on the white list; and
   in response to the account associated with the electronic device having been recharged and the second network resource address not being on the white list, generating a second network channel switching instruction, wherein the second network channel switching instruction instructs to switch the electronic device from the first APN network channel to the second APN network channel.

2. The method of claim 1, further comprising:
   sending the first network channel switching instruction to a service provider server.

3. The method of claim 1, further comprising:
   sending the second network channel switching instruction to a service provider server.

4. The method of claim 1, further comprising:
   obtaining an activation request for the electronic device;
   performing a verification of the electronic device using the activation request; and
   generating the second network channel switching instruction in response to the verification being successful.

5. The method of claim 1, wherein determining whether the first network resource address is on the white list comprises:
   obtaining the network resource address requested to be accessed by the electronic device; and
   determining whether the network resource address is on the white list is determined.

6. The method of claim 1, wherein determining whether the second network resource address is on the white list comprises:
   obtaining the second network resource address requested to be accessed by the electronic device; and
   determining whether the second network resource address is on the white list.

7. A server comprising:
   a memory storing computer executable instructions; and
   a processor executing the computer executable instructions to:
   obtain network information of an electronic device, the network information including whether an account associated with the electronic device is overdue;
   determine whether a first network resource address to be accessed is on a white list; and
   in response to the account associated with the electronic device being overdue and the first network resource address being on the white list, generate a first network channel switching instruction, wherein the first network channel switching instruction instructs to switch the electronic device from a second APN network channel to a first APN network channel, accessing the network through the first APN network channel does not incur data usage counting, and accessing the network through the second APN network channel incurs data usage counting;
   after the electronic device has been switched from the second APN network channel to the first APN network channel, obtain further network information of the electronic device, the further network information including whether the account associated with the electronic device has been recharged;
   determine whether a second network resource address to be accessed is on the white list; and
   in response to the account associated with the electronic device having been recharged and the second network resource address not being on the white list, generate a second network channel switching instruction, wherein the second network channel switching instruction instructs to switch the electronic device from the first APN network channel to the second APN network channel.

8. The server of claim 7, wherein the processor is further configured to send the first network channel switching instruction to a service provider server.

9. The server of claim 7, wherein the processor is further configured to:
   perform a verification of the electronic device upon receiving an activation request, and
   generate the second network channel switching instruction in response to the verification being successful.

* * * * *